United States Patent
Safford et al.

(10) Patent No.: US 7,290,169 B2
(45) Date of Patent: Oct. 30, 2007

(54) CORE-LEVEL PROCESSOR LOCKSTEPPING

(75) Inventors: Kevin David Safford, Fort Collins, CO (US); Christopher L. Lyles, Fort Collins, CO (US); Eric Richard Delano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 554 days.

(21) Appl. No.: 10/818,975

(22) Filed: Apr. 6, 2004

(65) Prior Publication Data

US 2005/0240811 A1 Oct. 27, 2005

(51) Int. Cl.
*G06F 11/00* (2006.01)

(52) U.S. Cl. ............... 714/11; 714/12; 714/49
(58) Field of Classification Search ............ 714/11, 714/12, 49
See application file for complete search history.

(56) References Cited

U.S. PATENT DOCUMENTS

| | | | |
|---|---|---|---|
| 4,785,453 A | 11/1988 | Chandran et al. | |
| 5,226,152 A | 7/1993 | Klug et al. | |
| 5,276,823 A * | 1/1994 | Cutts et al. ............... | 714/11 |
| 5,434,997 A | 7/1995 | Landry et al. | |
| 5,948,111 A | 9/1999 | Taylor et al. | |
| 6,065,135 A | 5/2000 | Marshall et al. | |
| 6,247,144 B1 | 6/2001 | Macias-Garza et al. | |
| 6,393,582 B1 * | 5/2002 | Klecka et al. ............... | 714/11 |
| 6,473,869 B2 * | 10/2002 | Bissett et al. ............... | 714/12 |
| 6,499,048 B1 | 12/2002 | Emrys | |
| 6,604,177 B1 | 8/2003 | Kondo et al. | |
| 6,615,366 B1 * | 9/2003 | Grochowski et al. ......... | 714/10 |
| 6,625,749 B1 * | 9/2003 | Quach ......................... | 714/10 |
| 6,640,313 B1 | 10/2003 | Quach | |
| 6,751,698 B1 * | 6/2004 | Deneroff et al. ............. | 710/317 |
| 6,820,213 B1 * | 11/2004 | Somers et al. ................ | 714/11 |
| 7,017,073 B2 | 3/2006 | Nair | |
| 7,055,060 B2 * | 5/2006 | Nguyen et al. ............... | 714/11 |
| 2001/0034824 A1 | 10/2001 | Mukherjee | |
| 2001/0034854 A1 | 10/2001 | Mukherjee | |
| 2002/0073357 A1 * | 6/2002 | Dhong et al. ................. | 714/19 |
| 2002/0133745 A1 | 9/2002 | Okin | |
| 2002/0144177 A1 | 10/2002 | Kondo et al. | |
| 2002/0152418 A1 * | 10/2002 | Griffin et al. ................. | 714/11 |
| 2002/0152420 A1 * | 10/2002 | Chaudhry et al. ............ | 714/11 |
| 2003/0005380 A1 * | 1/2003 | Nguyen et al. ............ | 714/736 |
| 2005/0108509 A1 | 5/2005 | Safford | |
| 2005/0240793 A1 | 10/2005 | Safford | |

FOREIGN PATENT DOCUMENTS

| EP | 0201356 B1 | 11/1986 |
|---|---|---|
| WO | WO94/08293 | 9/1993 |
| WO | WO 02/084490 | 10/2002 |

* cited by examiner

Primary Examiner—Gabriel Chu

(57) ABSTRACT

A device is provided which includes a first microprocessor core to generate a first output signal; a second microprocessor core to generate a second output signal; a switching fabric having a first input/output port; and lockstep logic, coupled between the first input/output port of the switching fabric and the first and second microprocessor cores, to detect whether the first output signal differs from the second output signal.

34 Claims, 9 Drawing Sheets

CORE-LEVEL PROCESSOR LOCKSTEPPING

Cross-Reference to Related Applications

This application is related to the following commonly-owned and concurrently-filed U.S. patent applications, which are hereby incorporated by reference:

"Voltage Modulation for Increased Reliability in an Integrated Circuit," Ser. No. 10/818,974;

"Architectural Support for Selective Use of a High-Reliability Mode in a Computer System," Ser. No. 10/819,241;

"Lockstep Error Signaling," Ser. No. 10/818,993; and

"Off-Chip Lockstep Checking," Ser. No. 10/818,994.

BACKGROUND

1. Field of the Invention

The present invention relates to microprocessor design and, more particularly, to techniques for implementing microprocessor lockstepping.

2. Related Art

Cosmic rays or alpha particles that strike a silicon-based device, such as a microprocessor, can cause an arbitrary node within the device to change state in unpredictable ways, thereby inducing what is referred to as a "soft error." Microprocessors and other silicon-based devices are becoming increasingly susceptible to soft errors as such devices decrease in size. Soft errors are transient in nature and may or may not cause the device to malfunction if left undetected and/or uncorrected. An uncorrected and undetected soft error may, for example, cause a memory location to contain an incorrect value which may in turn cause the microprocessor to execute an incorrect instruction or to act upon incorrect data.

One response to soft errors has been to add hardware to microprocessors to detect soft errors and to correct them, if possible. Various techniques have been employed to perform such detection and correction, such as adding parity-checking capabilities to processor caches. Such techniques, however, are best at detecting and correcting soft errors in memory arrays, and are not as well-suited for detecting and correcting soft errors in arbitrary control logic, execution datapaths, or latches within a microprocessor. In addition, adding circuitry for implementing such techniques can add significantly to the size and cost of manufacturing the microprocessor.

One technique that has been used to protect arbitrary control logic and associated execution datapaths is to execute the same instruction stream on two or more processors in parallel. Such processors are said to execute two copies of the instruction stream "in lockstep," and therefore are referred to as "lockstepped processors." When the microprocessor is operating correctly (i.e., in the absence of soft errors), all of the lockstepped processors should obtain the same results because they are executing the same instruction stream. A soft error introduced in one processor, however, may cause the results produced by that processor to differ from the results produced by the other processor(s). Such systems, therefore, attempt to detect soft errors by comparing the results produced by the lockstepped processors after each instruction or set of instructions is executed in lockstep. If the results produced by any one of the processors differs from the results produced by the other processors, a fault is raised or other corrective action is taken. Because lockstepped processors execute redundant instruction streams, lockstepped systems are said to perform a "functional redundancy check."

One difficulty in the implementation of lockstepping is that it can be difficult to provide clock signals which are precisely in phase with each other and which share exactly the same frequency to a plurality of microprocessors. As a result, lockstepped processors can fall out of lockstep due to timing differences even if they are otherwise functioning correctly. In higher-performance designs which use asynchronous interfaces, keeping two different processors in two different sockets on the same clock cycle can be even more difficult.

Early processors, like many existing processors, included only a single processor core. A "multi-core" processor, in contrast, may include one or more processor cores on a single chip. A multi-core processor behaves as if it were multiple processors. Each of the multiple processor cores may essentially operate independently, while sharing certain common resources, such as a cache or system interface. Multi-core processors therefore provide additional opportunities for increased processing efficiency. In some existing systems, multiple cores within a single microprocessor may operate in lockstep with each other.

In existing systems for enabling multiple microprocessor cores to operate in lockstep, the microprocessor typically connects to a single system bus, a portion of which is shared by two or more lockstepped cores in the microprocessor. Because only one core can access the shared portion of the bus at a time in such systems, such systems typically include circuitry for arbitrating between the multiple cores and for multiplexing the data from the current "bus master" core onto the system bus. In such designs, the lockstep circuitry is typically implemented at these points of arbitration and multiplexing. Implementing lockstep circuitry in this way can be very difficult, particularly because the requirements of the bus architecture and protocol may leave very little time to perform lockstep checking. Furthermore, in such systems all data from the bus is duplicated before being transmitted to the lockstepped cores.

SUMMARY

In one aspect of the present invention, a device is provided which includes a first microprocessor core to generate a first output signal; a second microprocessor core to generate a second output signal; a switching fabric having a first input/output port; and lockstep logic, coupled between the first input/output port of the switching fabric and the first and second microprocessor cores, to detect whether the first output signal differs from the second output signal.

Other features and advantages of various aspects and embodiments of the present invention will become apparent from the following description and from the claims.

DETAILED DESCRIPTION

Figure 1A:
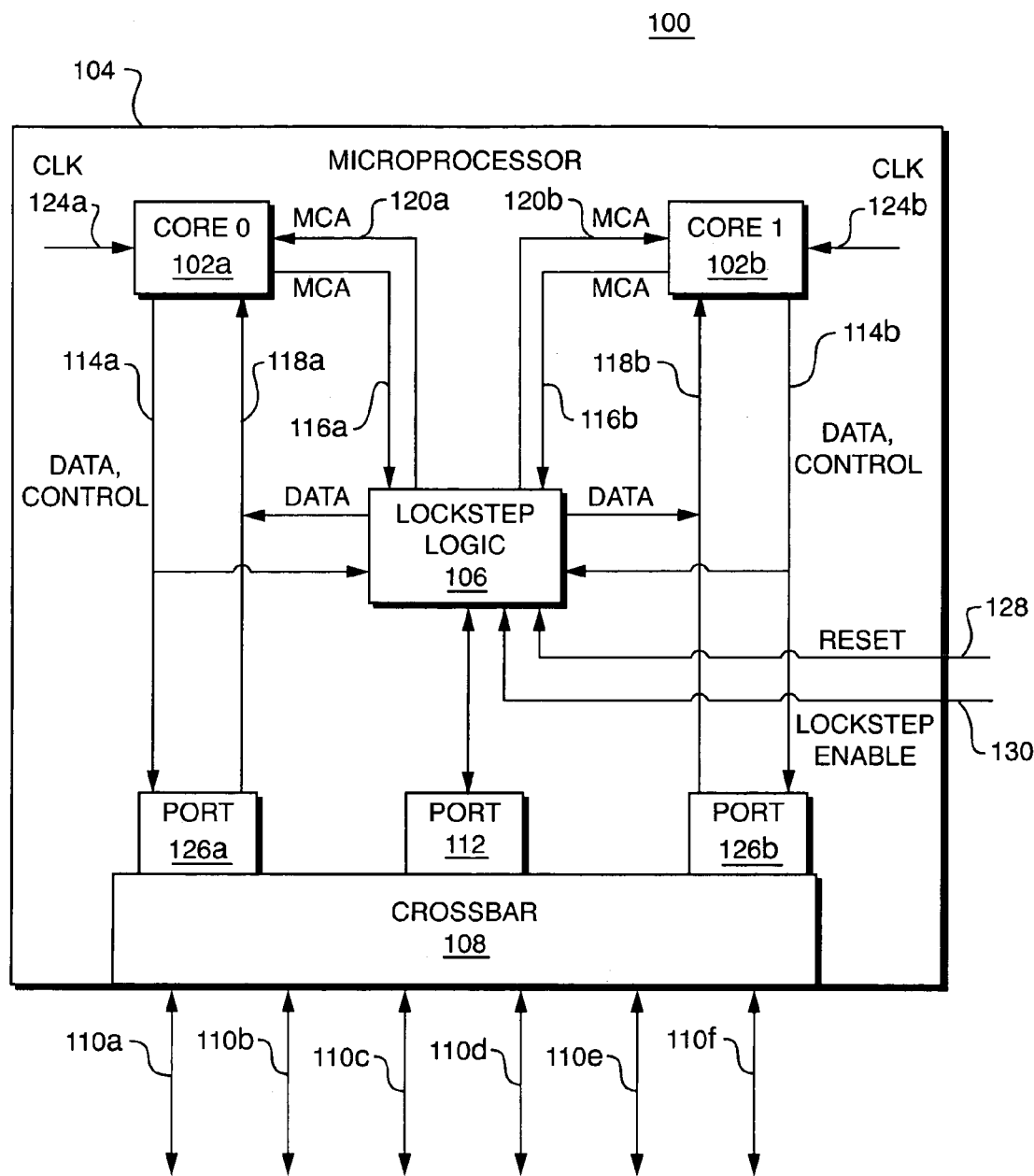
FIG. 1A is a block diagram of a system for operating multiple microprocessor cores in lockstep according to one embodiment of the present invention.

Referring to FIG. 1A, a block diagram is shown of a system 100 for operating multiple microprocessor cores 102a-b in lockstep according to one embodiment of the present invention. The cores 102a-b are components of a microprocessor 104, which may have additional cores (not shown in FIG. 1A for ease of illustration).

Cores 102a-b are coupled to ports 126a-b, respectively, of an on-chip crossbar 108. More specifically, core 102a outputs data/control signals to port 126a on line 114a and receives data signals from port 126a on line 118a. Similarly, core 102b outputs data/control signals to port 126b on line 114b and receives data signals from port 126b on line 118b.

The system 100 also includes lockstep logic 106, which is coupled to crossbar port 112. Lockstep logic 106 is coupled to data/control lines 114a-b and data lines 118a-b of cores 102a-b, through which the lockstep logic 106 may send and receive signals to and from the cores 102a-b.

Figure 1B:
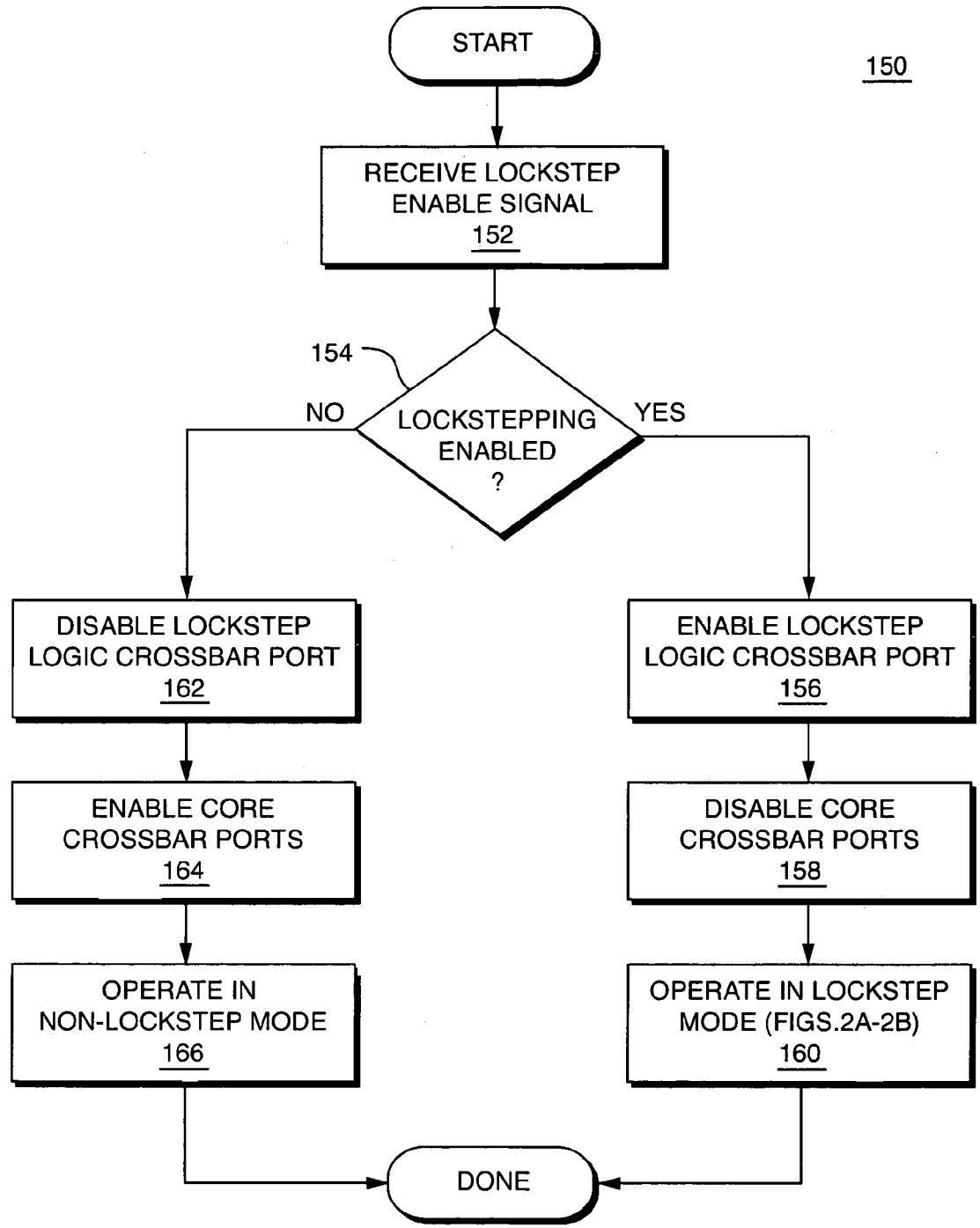
FIG. 1B is a flowchart of a method that is performed by the system of FIG. 1A to operate in either lockstep mode or non-lockstep mode according to one embodiment of the present invention.

The system 100 may operate in either a lockstep mode or a non-lockstep mode. Referring to FIG. 1B, a flowchart is shown of a method 150 that is performed by the system 100 in one embodiment of the present invention to operate in either lockstep mode or non-lockstep mode. Lockstep logic 106 receives, on line 130, a lockstep enable signal which indicates whether the lockstep logic 106 is to operate in lockstep mode (step 152). The lockstep enable line 130 may be coupled to configuration management circuitry or to any other circuitry for controlling whether the lockstep logic 106 is to operate in lockstep mode.

If the lockstep enable signal indicates that the lockstep logic 106 is to operate in lockstep mode (step 154), the lockstep logic crossbar port 112 is enabled (step 156), the core crossbar ports 126a-b are disabled (step 158), and the lockstep logic 106 operates in lockstep mode (step 160). Techniques that may be used by the lockstep logic 106 to operate in lockstep mode will be described in more detail below with respect to FIGS. 2A-2C. The microprocessor 104 may include circuitry for enabling/disabling ports 112 and 126a-b using techniques that are well-known to those of ordinary skill in the art.

If the lockstep enable signal indicates that the lockstep logic 106 is to operate in non-lockstep mode (step 154), the lockstep logic crossbar port 112 is disabled (step 162), the core crossbar ports 126a-b are enabled (step 164), and the lockstep logic 106 operates in non-lockstep mode (step 166). When in non-lockstep mode, the lockstep logic 106 does not perform lockstep error checking on the outputs of the cores 102a-b, and the lockstep logic 106 does not transmit signals on lines 118a-b to the cores 102a-b, respectively. Therefore, when the lockstep logic 106 operates in non-lockstep mode (step 166), the cores 102a-b communicate independently through their respective crossbar ports 126a-b without intervention by the lockstep logic 106.

Figure 2A:
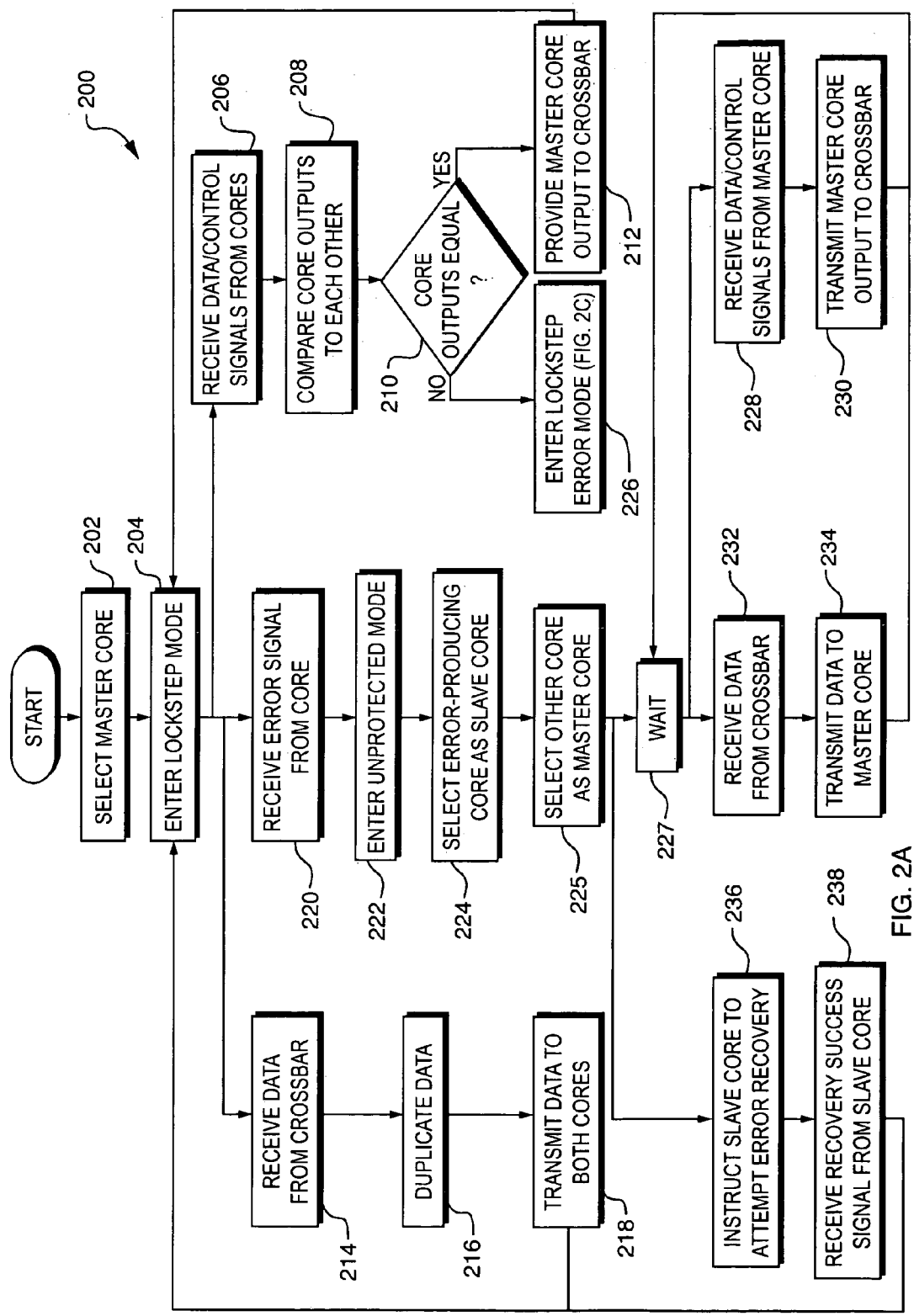
FIG. 2A is a flowchart of a method that is performed by the lockstep logic of FIG. 1A in one embodiment of the present invention.
Figure 2B:
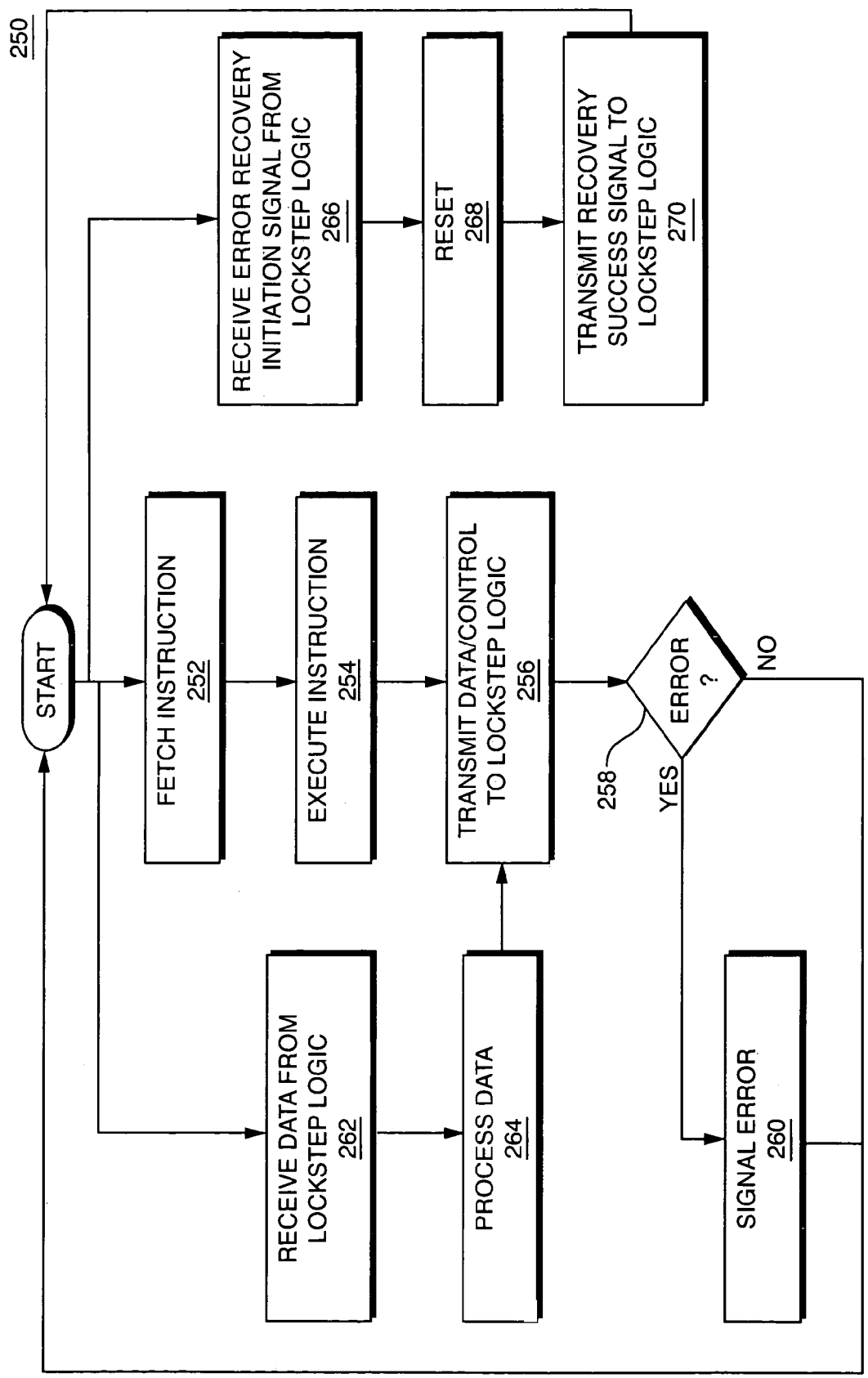
FIG. 2B is a flowchart of a method that is performed by lockstepped microprocessor cores in one embodiment of the present invention.

Referring to FIG. 2A, a flowchart is shown of a method 200 that is performed by the lockstep logic 106 in lockstep mode according to one embodiment of the present invention. Referring to FIG. 2B, a flowchart is shown of a method 250 that may be performed by either or both of the cores 102a-b in one embodiment of the present invention when the lockstep logic 106 is operating in lockstep mode. As mentioned above, the methods 200 and 250 may implement step 160 of method 150 (FIG. 1B).

The lockstep logic 106 selects one of the cores 102a-b as the "master core" and the other core as the "slave core" (step 202). Either of the cores 102a-b may be selected as the master or slave core. Alternatively, the selection of the master/slave may be done by external logic (such as fuses on the chip, or signals external to the chip.) The lockstep logic 106 enters lockstep mode (FIG. 2A, step 204). The next action taken by the lockstep logic 106 depends upon the input that the lockstep logic 106 next receives.

For example, referring to FIG. 2B, each of the cores 102a-b fetches the next instruction in the core's instruction stream (step 252), executes the instruction (step 254), and transmits any resulting data and/or control signals to the lockstep logic 106 (step 256). Referring to FIG. 2A, when the lockstep logic 106 receives such data/control signals on lines 114a-b (step 206), the lockstep logic 106 compares such outputs to each other (step 208). If the outputs of both cores 102a-b are the same (step 210), lockstep logic 106 provides the output of the master core to the crossbar 108 at port 112 (step 212). The crossbar 108 in turn transmits the master core output over one of a plurality of links 110a-f to a target component, such as a memory controller or another processor core (not shown), using techniques that are well-known to those of ordinary skill in the art.

When a data stream is received at port 112 from one of the links 110a-f at port 112 while the lockstep logic 106 is in lockstep mode, the lockstep logic 106 receives the data stream from the port 112 (step 214), duplicates the data stream (step 216), and transmits both copies of the data stream to cores 102a-b over data lines 118a-b (step 218). Referring to FIG. 2B, cores 102a-b receive the data from the lockstep logic 106 (step 262) and process it (step 264). When the lockstep logic 106 is operating in lockstep mode, each of the cores 102a-b performs step 264 in lockstep with the other core.

Note that although in the example just described the lockstep logic 106 receives output produced by every instruction executed by the cores 102a-b, this is merely an example and does not constitute a limitation of the present invention. For example, because in the example illustrated in FIG. 1A the lockstep logic 106 only processes signals transmitted by the cores 102a-b on lines 114a-b, the lockstep logic 106 does not compare the outputs of any instructions which do not cause the cores 102a-b to generate signals on lines 114a-b. Certain instructions, such as those which can be executed by a core solely using data within the microprocessor 104 (such as data stored in registers or an on-chip cache), may not require the core to transmit any data and/or control signals on lines 114a-b for off-chip processing. Such instructions, therefore, may be executed without generating any signals to be compared by the lockstep logic 106. If the cores 102a-b, however, are unable to complete execution of an instruction without off-chip data (such as data stored in an off-chip cache), the cores 102a-b may transmit messages on lines 114a-b (typically containing load or store instructions) which are compared by the lockstep logic 106.

It should be appreciated that devices which communicate with cores 102a-b through port 112 need only send and receive a single data stream through port 112, in the same manner as if communicating with a single processor or processor core, because the lockstep logic 106 transparently transmits data to and from the cores 102a-b as necessary. Using the techniques just described, therefore, the lockstep logic 106 performs lockstep checking on the cores 102a-b while providing the appearance of a single device coupled to port 112.

If a soft error or other error occurs in one of the cores 102a-b, the outputs of the cores 102a-b (on lines 114a-b) may differ from each other. If the lockstep logic 106 determines that the core outputs on lines 114a-b differ from each other (in step 210), the lockstep logic 106 exits lockstep mode and enters a mode that will be referred to herein as "lockstep error mode" (step 226). The operation of the lockstep logic 106 while in lockstep error mode will be described in more detail below with respect to FIG. 2C.

In one embodiment of the present invention, each of the cores 102a-b includes its own error-checking circuitry which checks for the occurrence of soft errors and/or other errors within the respective one of the cores 102a-b. Examples of such error-checking circuitry are well-known to those of ordinary skill in the art.

When the error-checking circuitry in one of the cores 102a-b detects an internal error, the core may transmit an error signal on the corresponding one of machine check architecture (MCA) lines 116a-b (FIG. 2B, step 260). In response to receipt of such an error signal (FIG. 2A, step 220), the lockstep logic 106 enters a mode that will be referred to herein as "unprotected mode" (step 222). In brief, when in unprotected mode the lockstep logic 106 stops performing lockstep checking, ignores the output produced by the core which signaled the error, and allows the other core to communicate bidirectionally with the crossbar port 112. The lockstep logic 106 attempts to clear the error and bring the error-producing core back into a normal mode of operation. If successful, the lockstep logic 106 returns to lockstep mode.

More specifically, when in unprotected mode the lockstep logic 106 selects the core that signaled the error as the slave core (step 224) and selects the other core as the master core (step 225).

In one embodiment of the present invention, when the lockstep logic 106 is in unprotected mode, the lockstep logic 106 does not perform lockstep error checking on the outputs of the cores 102a-b (on lines 114a-b). Rather, the lockstep logic 106 enters a wait state 227 in which it awaits data from the crossbar port 112 or the master core. The lockstep logic 106 transmits all output of the master core to the crossbar port 112 (steps 228-230) and transmits all input received at the crossbar port 112 to the master core and not to the slave core (steps 232-234).

When in unprotected mode, the lockstep logic 106 transmits an "initiate recovery" signal to the slave core on the corresponding one of the MCA lines 120a-b (step 236). In response to receipt of the "initiate recovery" signal (FIG. 2B, step 266), the slave core attempts to recover from the error it has experienced, such as by attempting to reset itself (step 268). In the example illustrated in FIGS. 2A-2B, it is assumed that the slave core recovers successfully and transmits a "recovery success" signal to the lockstep logic 106 on the corresponding one of the MCA lines 116a-b (FIG. 2B, step 270). In response to receiving the "recovery success" signal from the slave core (FIG. 2A, step 238), the lockstep logic 106 re-enters lockstep mode (step 204). Note that steps 236-238 may be performed concurrently with steps 227-234, and that exiting unprotected mode causes the loop in steps 227-234 to be terminated.

Although in the example illustrated in FIGS. 2A-2B, the lockstep logic 106 attempts to reset only the core from which an error signal has been received, the lockstep logic 106 may alternatively attempt to reset both cores 102a-b when an error signal is received from one of the cores. Furthermore, the lockstep logic 106 may reset itself 106 when an error signal has been received from one of the cores, in a further attempt to return to a mode of operation in which both cores 102a-b execute instructions in lockstep.

Figure 2C:
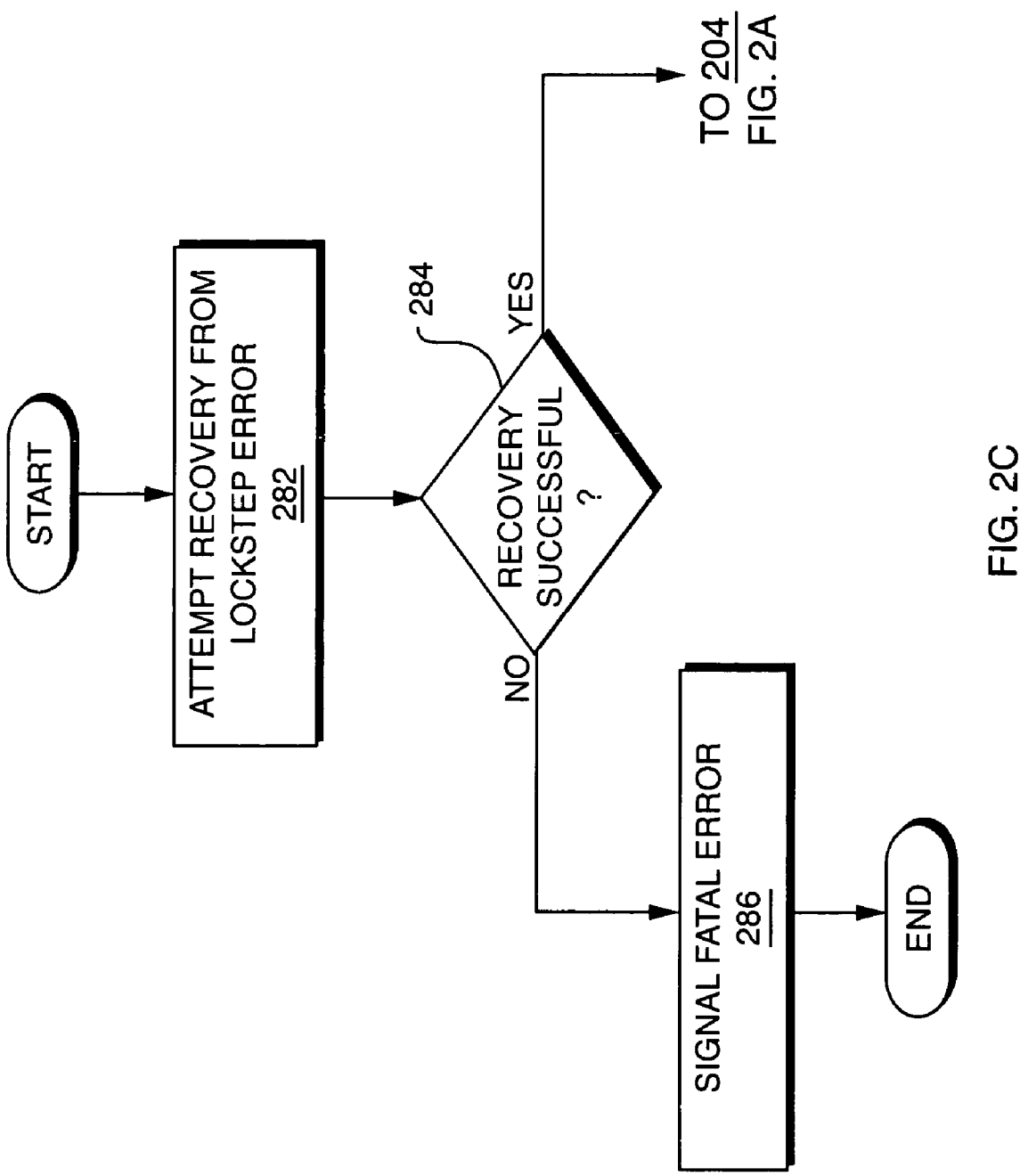
FIG. 2C is a flowchart of a method that is performed by the lockstep logic of FIG. 1A in a lockstep error mode according to one embodiment of the present invention.

Referring to FIG. 2C, a flowchart is shown of a method 280 that is performed by the lockstep logic 106 in response to detection of a lockstep error (FIG. 2A, step 226) according to one embodiment of the present invention. It can be difficult to recover from a lockstep error because typically it is not possible to determine which one of the cores 102a-b was responsible for the lockstep mismatch. A variety of techniques for attempting to recover from such an error, however, are well-known to those of ordinary skill in the art, such as attempting to return to some previous checkpoint and resetting both cores 102a-b and the lockstep logic 106. The lockstep logic 106 may attempt to perform such a recovery (step 282). If the recovery attempt is successful (step 284), the lockstep logic 106 re-enters lockstep mode (FIG. 2A, step 204). If the recovery attempt is unsuccessful, the lockstep logic 106 signals a fatal system error (step 288). Such an error typically requires the entire microprocessor 104 or the entire computer system 100 to be reset. Alternatively, the lockstep logic 106 may simply signal a fatal system error upon entering lockstep error mode, without attempting recovery.

Figure 3:
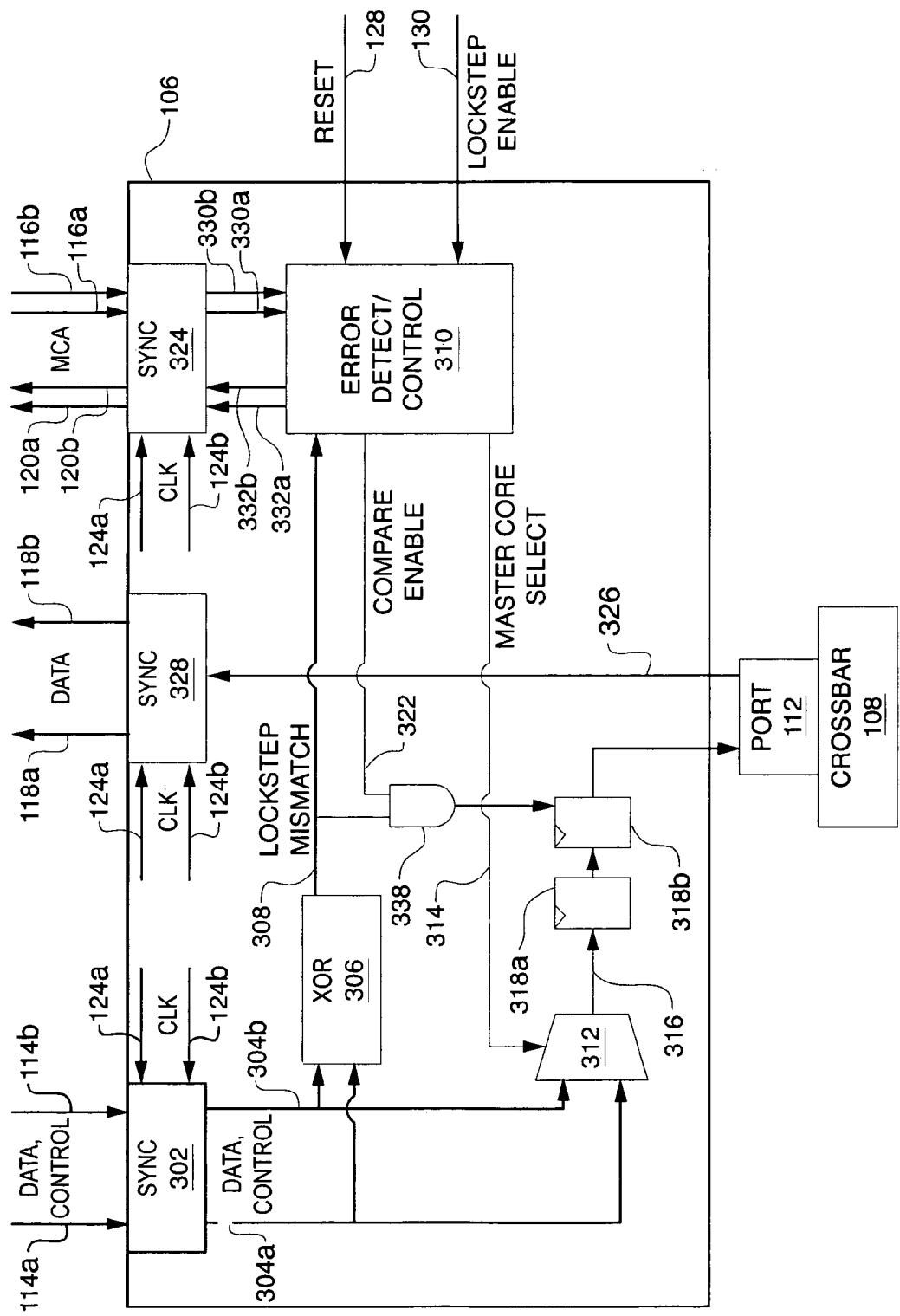
FIG. 3 is a block diagram illustrating the lockstep logic of FIG. 1A according to one embodiment of the present invention.

Referring to FIG. 3, the lockstep logic 106 is illustrated in more detail according to one embodiment of the present invention. As described above, lockstep logic 106 receives data/control signals from cores 102a-b on lines 114a-b, respectively (FIG. 2A, step 206). The signals on lines 114a-b may be slightly out of sync with each other due to differences between clock signals provided to cores 102a-b on clock lines 124a-b, respectively. Lockstep logic 106 therefore includes a synchronizer 302, which receives as inputs both the data/control outputs of cores 102a-b on lines 114a-b and the core clock signals on lines 124a-b. Synchronizer 302 produces synchronized data/control signals on lines 304a-b using techniques that are well-known to those of ordinary skill in the art.

Lockstep logic 106 also includes an exclusive OR (XOR) gate 306, which receives as inputs the synchronized data/control signals (on lines 304a-b) and performs a logical XOR operation on them to produce a "lockstep mismatch" signal on line 308 (FIG. 2A, steps 208-210). The lockstep mismatch signal is asserted only when the synchronized data/control signals on line 304a-b are unequal to each other, thereby indicating that a soft error or other error has occurred in one of the cores 102a-b.

Note that the synchronized data/control signals on lines 304a-b are provided as data inputs to a multiplexer 312. The output 316 of multiplexer 312 is coupled to the crossbar port 112 through staging registers 318a-b. A "master core select" signal is provided on line 314 to the selection input of the multiplexer 312, thereby selecting the data/control signal on one of lines 304a-b for output to the crossbar port 112.

In one embodiment of the present invention, the master core select signal is generated by an error detection and control engine 310. The error detection and control engine 310 may, for example, be implemented as a finite state machine in a ROM or other circuitry. The error detection and control engine 310 receives as inputs: (1) the lockstep mismatch signal on line 308; and (2) MCA signals on lines 330a-b. The MCA signals on lines 330a-b are synchronized versions of the MCA signals on lines 116a-b and are produced by a synchronizer 324 which is clocked by the core clock signals on lines 124a-b.

Engine 310 may detect when an error has occurred in cores 102a-b by reference to the MCA signals on lines 330a-b. When the error detection and control engine 310 detects such an error, the engine 310 enters unprotected mode, as described above (FIG. 2A, step 222). The engine 310 outputs a selection signal on line 314 which selects the data/control signal output by the master core as the output of the multiplexer 312. The multiplexer 312 thereby transmits the data/control signal output by the master core to the crossbar port 112 through staging registers 318a-b (FIG. 2A, step 212).

The engine 310 asserts a "compare enable" signal on line 322 when the engine 310 is in lockstep mode. Both the compare enable signal and the lockstep mismatch signal on line 308 are provided as inputs to an AND gate 338. The output of AND gate 338 is high, therefore, when the engine 310 is in lockstep mode and a lockstep error has occurred. The output of the AND gate 338 is provided as an input to a reset input of the second staging register 318b, thereby inhibiting the output of the staging register 318b when a lockstep error has occurred. This prevents the output of either of the cores 102a-b from being transmitted to crossbar port 112 when a lockstep error has occurred.

The purpose of staging registers 318a-b is to provide a delay before the output of the multiplexer 312 is provided to the crossbar port 112. Such a delay provides time for the inhibit signal (output by the AND gate 338) to be produced and thereby to prevent the output of the multiplexer 312 from being transmitted to the crossbar port 112 in the event that a lockstep error has occurred. Staging registers 318a-b may alternatively be implemented using a conventional first-in, first-out (FIFO)-type queue, or any other mechanism for introducing an appropriate delay.

When in unprotected mode (FIG. 2A, step 222), the engine 310 de-asserts the compare enable signal on line 322 and transmits a recovery initiation signal to the slave core on the corresponding one of MCA lines 120a-b (FIG. 2A, step 236). Note that the engine 310 produces MCA signals on lines 332a-b, and that synchronizer 324 synchronizes these signals to produce MCA signals on lines 120a-b. If the engine 310 subsequently receives a recovery success signal from the slave core on corresponding one of lines 120a-b (FIG. 2A, step 238), the engine 310 may re-enter lockstep mode (FIG. 2A, step 204), as described above, and re-assert the compare enable signal on line 322.

When the lockstep logic 106 receives data from the port 112 (FIG. 2A, step 214), the data are transmitted on line 326 to a synchronizer 328, which receives the core clock signals on lines 124a-b, and produces signals on lines 304a-b, respectively, which are synchronized with the clock signal (not shown) of the lockstep logic 106 itself. Synchronizer 328 duplicates the data stream on line 326 (step 216) and provides the duplicated and synchronized data stream to cores 102a-b on data lines 118a-b, respectively (step 218). Note that in the embodiment illustrated in FIG. 3, the data received from crossbar port 112 is provided to both cores 102a-b, whether the lockstep logic 106 is operating in lockstep mode or in unprotected mode. Alternatively, the lockstep logic 106 may be configured to provide the data on line 326 only to the master core when the lockstep logic is operating in unprotected mode (FIG. 2A, steps 232-234).

In the embodiments illustrated in FIGS. 1A and 3, the lockstep logic 106 is coupled to crossbar port 112. It is not required, however, that the lockstep logic 106 be directly coupled to the crossbar port 112. Rather, referring to FIG. 4A, a microprocessor 104 is shown according to an embodiment of the present invention in which lockstep logic 406 is coupled to crossbar ports 412a-b indirectly through cores 402a-b. As will now be described in more detail, the lockstep logic 406 may perform the same or similar functions indirectly through cores 402a-b as the lockstep logic 106 performs directly through port 112. Features of the cores 402a-b and lockstep logic 406 which are not illustrated in FIG. 4A may be implemented in the same manner as corresponding features of the cores 102a-b and lockstep logic 106, respectively (FIGS. 1A and 3).

Figure 4A:
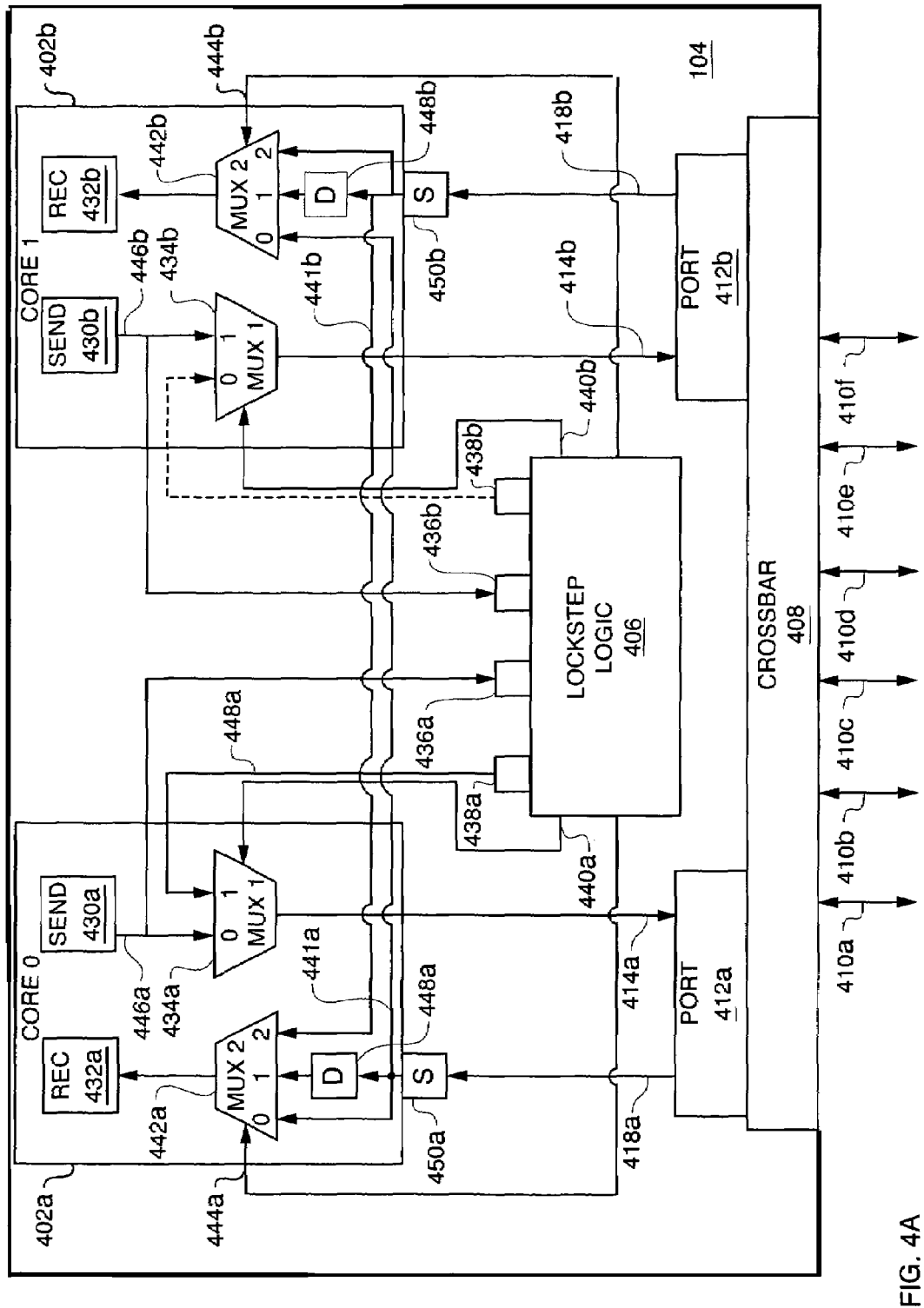
FIG. 4A is a schematic diagram of lockstepping circuitry according to one embodiment of the present invention.

The embodiment illustrated in FIG. 4A may be particularly useful for adding the lockstep logic 406 to an existing design in which cores 402a-b are already coupled to crossbar ports 412a-b, respectively. The lockstep logic 406 may be inserted into such a design, in the manner illustrated in FIG. 4A, without the need to decouple cores 402a-b from ports 412a-b and without the need to allocate an additional crossbar port to the lockstep logic 406.

Cores 402a-b include send logic 430a-b for transmitting data/control signals to ports 412a-b on lines 414a-b, respectively. Cores 402a-b also include receive logic 432a-b for receiving data signals from ports 412a-b on lines 418a-b, respectively. Techniques for implementing send logic 430a-b and receive logic 432a-b are well-known to those having ordinary skill in the art.

First consider operation of the microprocessor 404 when the lockstep logic 406 is in non-lockstep mode. Recall that in non-lockstep mode the cores 402a-b communicate independently with their respective ports 412a-b and the lockstep logic 406 does not perform lockstep checking on the outputs of the cores 402a-b. Turning first to the transmission of data by the send logic 430a-b, note that cores 402a-b include multiplexers 434a-b, which are coupled to send logic 430a-b, respectively. When the lockstep logic 406 is in non-lockstep mode, the outputs of send logic 430a-b (on lines 446a-b) pass through to lines 414a-b, respectively. This result is achieved by the lockstep logic 406 transmitting selection signals to multiplexers 434a-b on lines 440a-b, respectively, which select the outputs of send logic 430a-b (on lines 446a-b) for output on lines 414a-b, respectively.

Turning now to the receipt of data by the cores 402a-b when the lockstep logic 406 is in non-lockstep mode, note that cores 402a-b also include multiplexers 442a-b, which are coupled to receive logic 432a-b, respectively. When the lockstep logic 406 is in non-lockstep mode, the data received on lines 418a-b pass through synchronizers 450a-b to receive logic 432a-b, respectively. This result is achieved by the lockstep logic 406 transmitting selection signals to multiplexers 442a-b on lines 444a-b, respectively, which select the signals on input data line 418a-b for output to receive logic 432a-b, respectively.

Next consider operation of the system 400 when the lockstep logic 406 is in lockstep mode. In this mode, the lockstep logic 406 selects one of the cores 402a-b as the master core and selects one of the ports 412a-b as the "master port," i.e., the crossbar port through which to send and receive data. The lockstep logic 406 controls the cores 402a-b so that the output of the master core is transmitted to the crossbar 408 on the selected master port. When incoming data is received at the selected master port, the lockstep logic 406 duplicates the received data and controls the cores 402*a-b* so that the duplicated data is transmitted to both cores 402*a-b*.

More specifically, consider first the transmission of data by the cores 402*a-b* when the lockstep logic 406 is in lockstep mode. Assume for purposes of example that the lockstep logic 406 selects core 402*a* as the master core and selects port 412*a* as the master port. When send logic 430*a* in (master) core 402*a* transmits an output signal on line 446*a*, the signal is received by lockstep logic 406 at input 436*a*. Lockstep logic 406 retransmits the signal at output 438*a* to multiplexer 434*a* on line 448*a*, and transmits a selection signal on line 440*a* which selects the signal on line 448*a* for output by the multiplexer 434*a* on line 414*a*. Lockstep logic 406 thereby enables the selected master core 402*a* to transmit output to the selected master port 412*a*.

Under the same circumstances, the lockstep logic 406 receives output from the (slave) core 402*b* at input 436*b*. The lockstep logic 406 may compare the outputs received from both cores 402*a-b* in the manner described above with respect to FIG. 1A. Because the core 402*b* is the slave core, however, the lockstep logic 406 need not retransmit the output of the slave core 402*b*. In this case, no output is provided on port 412*b*. The selected master port 412*a* thereby acts as a single output port for the lockstep logic 406, in a manner that is functionally equivalent to the configuration illustrated in FIG. 1A, in which lockstep logic 106 is coupled directly to crossbar port 112.

Now consider a case in which core 402*b* is selected as the master core and port 412*a* is selected as the master port. When send logic 430*b* in (master) core 402*b* transmits an output signal on line 446*b*, the signal is received by lockstep logic 406 at input 436*b*. Lockstep logic 406 retransmits the signal at output 438*a* to multiplexer 434*a* on line 448*a*, and transmits a selection signal on line 440*a* which selects the signal on line 448*a* for output by the multiplexer 434*a* on line 414*a*. Lockstep logic 406 thereby enables the selected master core 402*b* to transmit output to the selected master port 412*a*, by using the (slave) core 402*a* as an intermediary through which to transmit output to the selected master port 412*a*.

It should be apparent from the preceding discussion that similar techniques may be used to provide output from the selected master core to the selected master port when either of cores 402*a-b* is selected as the master core, in combination with selection of either of ports 412*a-b* as the master port. Note that line 448*b* is illustrated as a dashed line because line 448*b* may be omitted if the lockstep logic 406 is implemented to always select port 412*a* as the master port. In such an implementation, the lockstep logic 406 may still select either of the cores 402*a-b* as the master core.

Note that while in lockstep mode, the lockstep logic 406 may arbitrarily select either of the cores 402*a-b* as the master core. Furthermore, the lockstep logic 406 may duplicate the output of the master core and provide the duplicated output at both ports 412*a-b* (through multiplexers 434*a-b*) if desired.

Now consider the receipt of data by the cores 402*a-b* from the crossbar 408 when the lockstep logic 406 is in lockstep mode. When in lockstep mode, the lockstep logic 406 duplicates the data received at the selected master port and provides the duplicated data to both cores 402*a-b*. Assume for purposes of example that the lockstep logic 406 selects core 402*a* as the master core and selects port 412*a* as the master port. Data that is transmitted by other components (not shown) in response to transmissions through port 412*a* will therefore also be received through the same port 412*a*.

Lockstep logic 406 duplicates the incoming signal received at port 412*a* to both cores 402*a-b* as follows. Note that input line 418*a* is split (either before or after the synchronizer 450*a*) to provide the same signal to core 402*b* on line 441*a*. Lockstep logic 406 provides a selection signal on line 444*b* to multiplexer 442*b* which selects line 441*a* for output to receive logic 432*b*. Receive logic 432*b* thereby receive the signal received from (master) port 412*a* on line 418*a*.

Note that core 402*a* includes delay circuit 448*a*, which is coupled to input line 418*a* and to the center data input of multiplexer 442*a*. Lockstep logic 406 provides a selection signal on line 444*a* to multiplexer 432*a* which selects the output of delay circuit 448*a* for output to receive logic 432*a*. The delay circuit 448*a* introduces a delay that is intended to be equal to the delay incurred by transmitting the input signal to core 402*b* on line 441*a*. Receive logic 432*a* and 432*b* thereby receive the input signal received on line 418*a* at the same or substantially similar times.

It should be appreciated that similar techniques may be used to duplicate the input received from crossbar port 412*b* and to provide the duplicated input to both cores 402*a-b* if port 412*b* is selected as the master port. More specifically, lockstep logic 406 may provide a selection signal on line 444*a* to multiplexer 442*a* which selects the signal on line 441*b* for output to receive logic 432*a*. Furthermore, the lockstep logic 406 may provide a selection signal on line 444*b* to multiplexer 442*b* which selects the output of delay circuit 448*b* (coupled to port 412*b*) for output to receive logic 432*b*. Receive logic 432*a* and 432*b* thereby receive the input signal received on line 418*b* at the same or substantially similar times.

Finally, consider operation of the system 400 when the lockstep logic is operating in unprotected mode (FIG. 2A, steps 222-238). When in unprotected mode, the lockstep logic 406 may operate in the same manner as in lockstep mode, e.g., by providing output from the master core to the master crossbar port, and by providing input from the selected crossbar port to both of the cores 402*a-b*. Optionally, the lockstep logic 406 may provide input from the master crossbar port only to the master core (FIG. 2A, step 234), thereby avoiding the need to duplicate incoming data to the slave core.

Figure 4B:
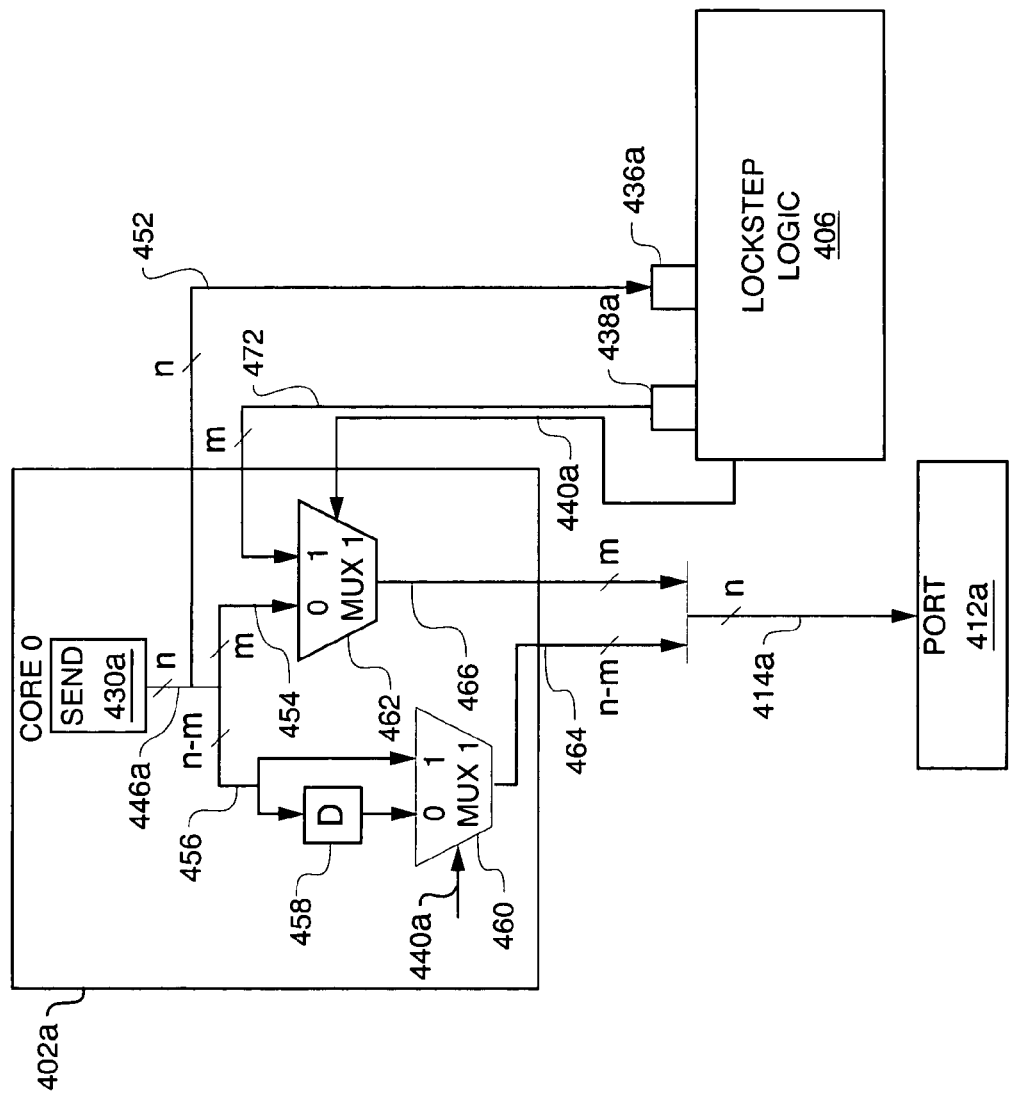
FIG. 4B is a schematic diagram of an alternative embodiment of the core circuitry illustrated in FIG. 4A.

Referring to FIG. 4B, a schematic diagram is shown of circuitry that may be used in the core 402*a* as an alternative to the multiplexer 434*a*. Recall that in the embodiment illustrated in FIG. 4A, all of the data transmitted by the core 402*a* to input 436*a* of the lockstep logic 406 may be transmitted back to the core by the lockstep logic 406 on line 448*a*. As will now be described in more detail, in the embodiment illustrated in FIG. 4B, the lockstep logic 406 transmits fewer than the original number of bits back to the core 402*a*, thereby simplifying the wiring of the circuit. The same circuitry may be implemented in the other core 402*b* to achieve an additional benefit.

The send logic 430*a* transmits an n-bit output on lines 446*a*. The entire n-bit output is transmitted on lines 452 to lockstep logic input 436*a*. Within the core 402*a*, however, the n-bit output is split into an m-bit signal on lines 454 (where m<n) and an (n-m)-bit signal on lines 456. The m-bit signal on lines 454 may include certain critical control bits, such as the "valid," "poison," and "viral" bits that are commonly used in microprocessors. As described in more detail in the above-referenced patent application entitled "Lockstep Error Signaling," one or more of such bits may be set to signal that a lockstep error or other error has occurred. Note, however, that the m-bit signal may include any number of bits whose values may be modified by the lockstep logic 406 for signaling errors or performing other functions. The (n-m)-bit signal on lines 456 may include the remaining bits from the original n-bit signal on lines 446a.

Consider first the operation of the circuitry illustrated in FIG. 4B when the lockstep logic 106 operates in non-lockstep mode. When in non-lockstep mode, the lockstep logic 106 transmits a zero value on the lockstep select line 440a, which is provided as an input to multiplexers 460 and 462. In response, multiplexer 460 selects the (n-m)-bit signal on lines 456 for output on lines 464, and multiplexer 462 selects the m-bit signal on lines 454 for output on lines 466. The signals on lines 464 and 466 are combined into the original n-bit signal on lines 414a and then provided to crossbar port 412a. In summary, in non-lockstep mode the n-bit signal output by the send logic 430a is provided to the crossbar port 412a.

Consider now the operation of the circuitry illustrated in FIG. 4B when the lockstep logic 106 operates in lockstep mode and therefore outputs the value 1 on lockstep select line 440a. Lockstep logic 406 outputs an m-bit signal on lines 472 which contains the same bit fields (e.g., valid, poison, and viral) as the m-bit signal on lines 454. The values of the m-bit signals on lines 454 and 472 may differ, however, since the m-bit signal on lines 472 may have been obtained from core 402b if core 402b is the master core. The values of the m-bit signals on lines 454 and 472 may also differ if, for example, the lockstep logic 406 has detected a lockstep error and signaled the error in the m-bit signal on lines 472, as described in more detail in the above-referenced patent application entitled "Lockstep Error Signaling." In response to receiving the 1-value selection signal on line 440a, the multiplexer 462 outputs the m-bit signal from lines 472 on lines 466.

The (n-m)-bit signal on lines 456 is provided to a delay circuit 458 (such as one or more staging latches), which provides a delayed version of the signal to the multiplexer 460. The delay introduced by the delay circuit 458 is calibrated to be substantially equal to the delay between the m-bit signals on lines 454 and 474 (introduced by the lockstep logic 406). In response to receiving the 1-value selection signal on line 440a, the multiplexer 460 outputs the delayed (n-m)-bit signal on lines 464. The signals on lines 464 and 466 are combined into an n-bit signal on lines 414a and then provided to crossbar port 412a. In summary, in lockstep mode a portion of the n-bit signal output by the send logic 430a is delayed and provided to the crossbar port 412a, while the remainder of the signal provided to the crossbar port 412a is obtained from the lockstep logic 406. The need for the lockstep logic 406 to transmit an entire n-bit signal to the core 402a is thereby eliminated, as is the corresponding wiring.

Figure 5:
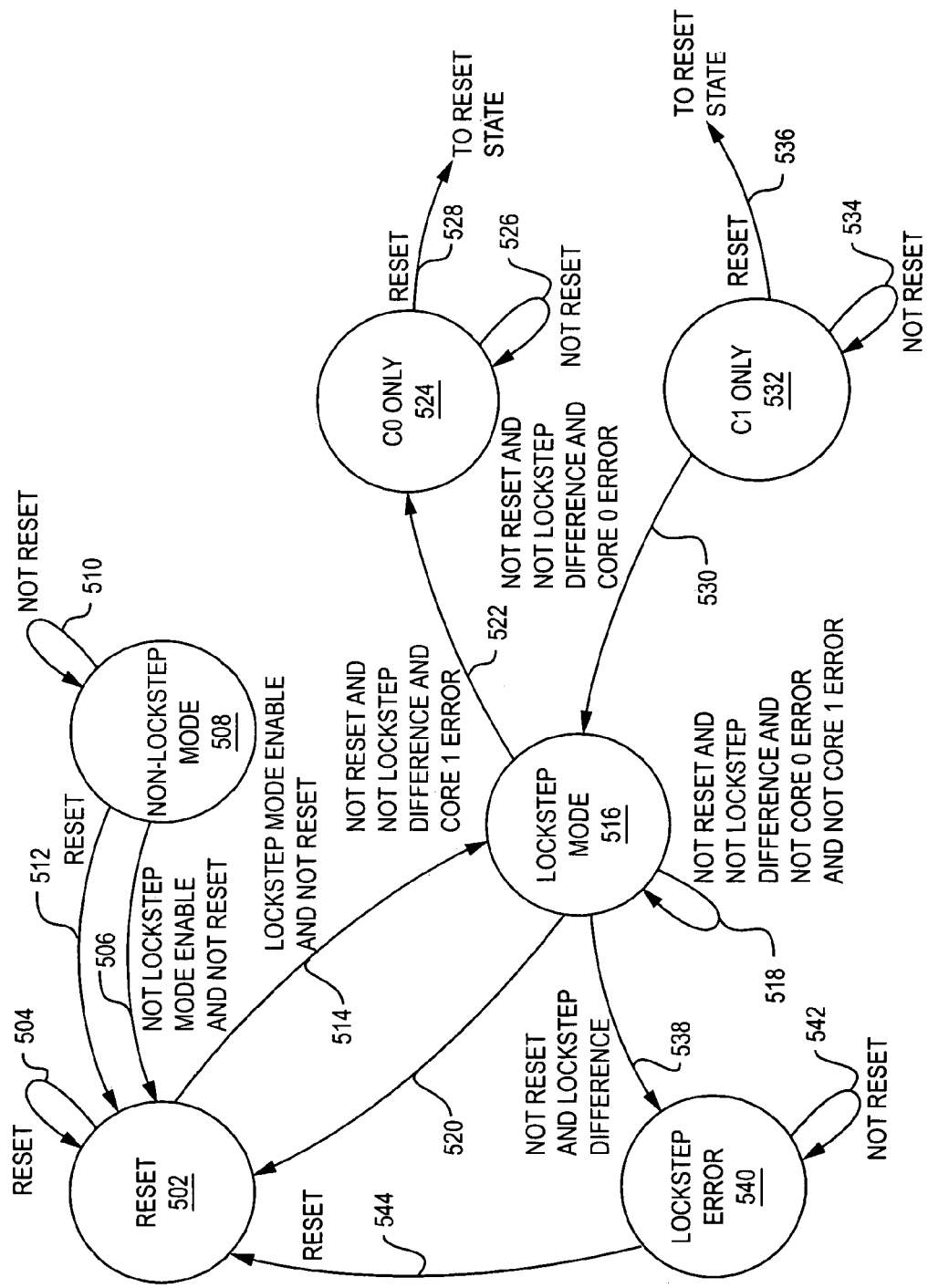
FIG. 5 is a finite state machine diagram which illustrates the operation of the error detection and control engine of FIG. 3 according to one embodiment of the present invention.

As stated above, the error detection and control engine 310 (FIG. 3) may implement a finite state machine. Referring to FIG. 5, a finite state machine diagram is shown which illustrates the operation of the engine 310 according to one embodiment of the present invention. In FIG. 5, circles represent states of the finite state machine and are labeled with the corresponding state name, while arcs represent transitions between states and are labeled with the inputs which trigger the corresponding state transition. FIG. 5 will be described with respect to components of the embodiments illustrated in FIGS. 1A, 3, and 4 which may implement the state machine illustrated in FIG. 5. Although the following description may refer both to lockstep logic 106 and lockstep logic 406, and similarly to cores 102a-b and cores 402a-b, those having ordinary skill in the art will appreciate how to implement lockstep logic and cores having the combined features described in the following description.

TABLE 1

| | Lockstep Checking Enabled | Lockstep Error to Core 0 | Lockstep Error to Core 1 | Core 0 Mux Sel 1 | Core 0 Mux Sel 2 | Core 1 Mux Sel 1 | Core 1 Mux Sel 2 |
|---|---|---|---|---|---|---|---|
| Reset | 0 | 0 | 0 | 0 | 0 | 0 | 0 |
| Non-Lockstep Mode | 0 | 0 | 0 | 0 | 0 | 0 | 0 |
| Lockstep Mode | 1 | 0 | 0 | 1 | 1 | X | 2 |
| C0 Only | 0 | 0 | 0 | 1 | 1 | X | X |
| C1 Only | 0 | 0 | 0 | 1 | 1 | X | 2 |
| Lockstep Error | 0 | 1 | 1 | 1 | 1 | X | X |

Table 1 illustrates the outputs of the lockstep logic 406 in each of the states illustrated in FIG. 5. The leftmost column of Table 1 lists the states illustrated in FIG. 5. The row corresponding to each state indicates: (1) whether the engine 310 performs lockstep checking while in that state; and (2) which signals are output by the engine 310 while in that state. Each row in Table 1 will be described in more detail in conjunction with the description of the corresponding state.

Referring to FIG. 3, note that reset line 128 is coupled to a reset input of engine 310. Assertion of the reset line 128 causes the engine to enter a reset state 502. Engine 310 remains in reset state 502 so long as reset line 128 is asserted (arc 504). Reset line 128 may be coupled to conventional reset circuitry (not shown) or to any other component for resetting the engine 310. As indicated in the row labeled "Reset" in Table 1, while in the reset state 502 the engine 310 does not perform lockstep checking (as indicated by the zero in the column labeled "Lockstep Checking Enabled").

The columns labeled "Lockstep Error to Core 0" and "Lockstep Error to Core 1" indicate whether the engine 310 signals a lockstep error to the cores 102a-b, respectively, on MCA lines 120a-b. As indicated in the row labeled "Reset" in Table 1, while in the reset state 502, the engine 310 does not signal a lockstep error to either of the cores 102a-b.

Now consider the column labeled "Core 0" in Table 1. This column contains two sub-columns, labeled "Mux Sel 1" and "Mux Sel 2," which correspond to the multiplexer selection signals transmitted by the lockstep logic 406 to multiplexers 434a and 442a on lines 440a and 444a, respectively. As indicated in the row labeled "Reset" in Table 1, while in the reset state 502, the engine 310 outputs a zero on both lines 440a and 444a, thereby causing the output of send logic 430a to pass through to receive port 412a and causing the receive logic 432a to receive input from the port 412a. Similarly, with respect to core 402b (indicated by the "Core 1" column in Table 1), while in the reset state 502, the engine 310 outputs a zero on both lines 440b and 444b, thereby causing the output of send logic 430b to pass through to receive port 412b and causing the receive logic 432b to receive input from the port 412b.

Referring again to FIG. 3, recall that lockstep enable line 130 is coupled to a lockstep enable input of engine 310. De-assertion of the lockstep enable line 130 when reset line 128 is de-asserted causes the engine 310 to enter a non-lockstep mode state 508 (arc 506), in which the engine 310 operates in non-lockstep mode in the manner described above. The engine 310 returns to reset state 502 if the reset line 128 is asserted (arc 512).

Referring to the row labeled "Non-Lockstep Mode" in Table 1, while in the non-lockstep mode state 508 the engine 310: (1) does not perform lockstep checking; (2) does not transmit a lockstep error signal to either of the cores 402a-b; and (3) transmits a selection value of zero on all of the selection inputs to multiplexers 442a-b and 434a-b.

Assertion of the lockstep enable line 130 when reset line 128 is de-asserted causes the engine 310 to enter a lockstep mode state 516 (arc 514), in which the engine 310 operates in lockstep mode in the manner described above. Referring to the row labeled "Lockstep Mode" in Table 1, while in the lockstep mode state 516 the engine 310: (1) performs lockstep checking; (2) does not transmit a lockstep error signal to either of the cores 402a-b; (3) transmits a selection value of one to multiplexers 434a and 442a; and (4) transmits a selection value of two to multiplexer 442b. These particular values assume for purposes of example that core zero (e.g., core 402a) is the master core in lockstep mode.

Now consider each of the multiplexer selection values transmitted by the lockstep logic 406 in lockstep mode, as indicated in Table 1. Turning first to the "Mux Sel 1" columns, the value of one transmitted on line 440a causes multiplexer 434a to select as its output the signal transmitted by lockstep logic 406 on line 448a, which is the output from whichever core is currently selected as the master core. The value of one transmitted on line 444a causes multiplexer 442a to select its middle input, which receives the delayed input from crossbar port 412a. The "X" in the "Mux Sel 1" sub-column of the "Core 1" column in Table 1 indicates that the lockstep logic 406 may output any value on selection line 440b, since the lockstep logic 406 communicates through port 412a in the example illustrated in FIG. 4A.

Turning now to the "Mux Sel 2" columns of the "Lockstep Mode" row in Table 1, the value of one transmitted on line 444a causes multiplexer 442a to select its center input, which receives the delayed input from port 412a. The value of two transmitted on line 444b causes multiplexer 442b to select its leftmost input, which receives the input from port 412a.

If the engine 310 is in the lockstep mode state 516 and the engine receives an error signal (on line 116b) from core 402b while neither the reset line 128 nor the lockstep mismatch line 308 are asserted, the engine 310 enters an error state 524 referred to as "C0 Only" (arc 522), because in this state 524 the engine 310 selects core 402a (core 0) as the master core and transmits input and output solely through core 402a.

Referring to the row labeled "C0 Only" in Table 1, while in the "C0 Only" state 524 the engine 310: (1) does not perform lockstep checking; (2) does not transmit a lockstep error signal to either of the cores 402a-b; and (3) transmits a selection value of one to multiplexers 434a and 442a. The "C0 Only" state 524 is an example of a state implementing the "unprotected mode" described above with respect to steps 222-238 of FIG. 2A. It should be appreciated from the description above that these multiplexer selection values enable the core 402a to communicate in both directions with crossbar port 412a. The "X" values in the "Core 1" column of the "C0 Only" column in Table 1 indicates that the lockstep logic 406 may output any value on selection lines 440b and 444b, since the lockstep logic 406 communicates solely with core 402a while in the "C0 Only" state 524.

The engine 310 remains in the "C0 Only" state 524 so long as the reset line 128 is not asserted (arc 526). If the reset line 128 is asserted while the engine 310 is in the "C0 Only" state 524, the engine 310 returns to the reset state 502.

If the engine 310 is in the lockstep mode state 516 and the engine receives an error signal (on line 116a) from core 402a while neither the reset line 128 nor the lockstep mismatch line 308 are asserted, the engine 310 enters an error state 532 referred to as "C1 only" (arc 530), because in this state 532 the engine 310 selects core 402b (core 1) as the master core and transmits input and output solely through core 402b. The "C1 Only" state 532 is another example of a state implementing the "unprotected mode" described above with respect to steps 222-238 of FIG. 2A.

Referring to the row labeled "C1 Only" in Table 1, while in the "C1 only" state 532 the engine 310: (1) does not perform lockstep checking; (2) does not transmit a lockstep error signal to either of the cores 402a-b; (3) transmits a selection value of one to multiplexers 434b and 442b; and (4) transmits a selection value of two to multiplexer 442b.

These multiplexer selection values enable the core 402b to communicate in both directions with crossbar port 412a. More specifically, consider the output of send logic 430b, which is received at input 436b of lockstep logic 406. Lockstep logic 406 retransmits this signal at output 438a to multiplexer 434a. The selection value of one transmitted by lockstep logic on line 440a causes multiplexer 434a to transmit the output of send logic 430b to port 412a. Now consider the input path to receive logic 432b. The selection value of two transmitted by lockstep logic 406 on line 444b causes multiplexer 442b to select its leftmost input, which is coupled to port 412a. Receive logic 432b thereby receives input from port 412a.

The engine 310 remains in the "C1 Only" state 532 so long as the reset line 128 is not asserted (arc 534). If the reset line 128 is asserted while the engine 310 is in the "C1 Only" state 532, the engine 310 returns to the reset state 502.

If the lockstep mismatch line 308 is asserted (indicating a lockstep error) and the reset line 128 is not asserted while the engine 310 is in the lockstep mode state 516, the engine 310 enters a lockstep error state 540 (arc 538). Referring to the row labeled "Lockstep Error" in Table 1, while in this state 540, the engine 310: (1) does not perform lockstep checking; (2) transmit lockstep error signals to both of the cores 402a-b; and (3) transmits a selection value of one to multiplexers 434b and 442b. It should be appreciated from the description above that the transmission of error signals to the cores 402a-b causes them to attempt to reset themselves or take other appropriate action, and that the transmission of these particular selection values to the multiplexers 442a-b and 434a-b enables core 402a to communicate bidirectionally with port 412a in the same manner as in the "C0 Only" state 524.

The engine 310 remains in the "Lockstep Error" state 540 so long as the reset line 128 is not asserted (arc 542). If the reset line 128 is asserted while the engine 310 is in the "Lockstep Error" state 540, the engine 310 returns to the reset state 502.

Among the advantages of the invention are one or more of the following. The techniques disclosed herein may be used in conjunction with a crossbar having asynchronous point-to-point links and thereby avoid the need to comply with the tight timing requirements typically imposed by bus-based architectures on lockstepping circuitry. In particular, the XOR gate 306 and/or the error control and detection engine 310 may introduce delays into communications over the port 112 that would not be tolerated by a conventional shared bus. As a result, the lockstep logic 106 may be implemented more quickly, easily, and inexpensively than lockstep logic intended for use with a shared bus.

A further benefit of the loosened timing requirements typically associated with crossbars is that the data from the cores 102a-b may be latched for an arbitrary number of clock cycles (using, for example, latches 318a-b) inside the lockstep logic 106. Although such latching of data introduces a small delay when the lockstep logic 106 operates in lockstep mode, such a delay may enable the engine 310 to be implemented more simply and thereby reduce overall design cost.

Furthermore, shared system buses typically have a large number of external pins, often numbering in the hundreds, to which components (such as lockstepping circuitry) must be coupled. Designing and implementing the wiring for such circuitry can be time-consuming and costly. The crossbar port 112, in contrast, may have a relatively small number of bits (e.g., 32 for data and 10 for control), thereby simplifying the design and implemented of wiring for coupling the lockstep logic 106 to the port 112.

Furthermore, the embodiment illustrated in FIG. 4A enables the lockstep logic 406 to be provided without allocating an additional crossbar port to the lockstep logic 406. In such an implementation, while in lockstep mode the lockstep logic 406 communicates with the crossbar 408 through an existing port coupled to one of the cores 402a-b. When the lockstep logic 406 is in non-lockstep mode, the cores 402a-b may continue to communicate directly with their respectively crossbar ports 412a-b without interference by the lockstep logic 406. As a result, all of the crossbar ports may be allocated to microprocessor cores, without the need to allocate ports separately to the lockstep logic 406.

In addition, the embodiment illustrated in FIG. 4B demonstrates an example of techniques that may be used to provide only a subset of the signals output by the cores 402a-b to the lockstep logic 406. Such techniques reduce the amount of wiring required to connect the cores 402a-b to the lockstep logic 406 and thereby simplify the wiring required to support the lockstep logic 406. Such techniques may therefore enable embodiments of the invention to be implemented in a smaller area and at lower cost.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although six links 110a-f are shown in FIG. 1A, the crossbar 108 may have any number of links. The links 110a-f may be asynchronous with respect to the cores 102a-b; i.e., the links 110a-f and cores 102a-b may operate at different clock frequencies with respect to each other. Furthermore, the links 110a-f may be asynchronous with respect to each other. Although the lockstep logic 106 and crossbar 108 in FIG. 1A are on the same chip as the cores 102a-b, this is not a requirement of the present invention.

Although the XOR gate 306 is used in the embodiment illustrated in FIG; 3 to compare the outputs of the cores 102a-b, the XOR gate 306 is merely one example of a comparator. More generally, any component implementing any comparison function may be used to compare the outputs of the cores 102a-b.

Although the crossbar 108 is shown in FIG. 1A, the crossbar is merely one example of a switching fabric (also referred to as a system fabric) which includes a plurality of input ports and a plurality of output ports, and which is capable of creating arbitrary point-to-point links between input-output port pairs. Switching fabrics other than crossbar ports may be used in conjunction with embodiments of the present invention.

Although various connections in the embodiments illustrated herein (such as lines 114a-b, 116a-b, and 118a-b) may be described above as individual lines, each such connection may include any number of lines, as may be necessary or desirable to carry associated signals. Furthermore, such connections may transmit signals serially or in parallel, using any communications protocol.

The lockstep logic 106 may be implemented in custom-designed analog or digital circuitry, application-specific integrated circuits (ASICs), field-programmable gate arrays (FPGAs), computer hardware, software, or firmware, or any combination thereof.

What is claimed is:

1. A device comprising:
    a first microprocessor core to generate a first output signal;
    a second microprocessor core to generate a second output signal;
    a switching fabric comprising a plurality of input/output ports including a first input/output port operating at a frequency that differs from a frequency at which at least one other one of the plurality of input/output ports operates; and
    lockstep logic, coupled between the first input/output port of the switching fabric and the first and second microprocessor cores, to detect whether the first output signal differs from the second output signal.

2. The device of claim 1, wherein the lockstep logic comprises:
    means for transmitting the first output signal to the first input/output port;
    means for receiving an input signal from the first input/output port; and
    means for transmitting the input signal to the first microprocessor core and to the second microprocessor core.

3. The device of claim 1, wherein the lockstep logic comprises:
    means for receiving an error signal from one of the first and second microprocessor cores;
    and means for transmitting an error recovery initiation signal to at least one of the first and second microprocessor cores in response to receipt of the error signal.

4. The device of claim 1, wherein the switching fabric comprises a crossbar.

5. The device of claim 1, wherein the first microprocessor core is clocked by a first clock having a first frequency and wherein the first input/output port operates at a second frequency which differs from the first frequency.

6. The device of claim 1, further comprising an integrated circuit including the first microprocessor core, the second microprocessor core, the switching fabric, and the lockstep logic.

7. A method performed by lockstep logic coupled to a first of a system fabric, the method comprising a step of:
    (A) in a lockstep mode of operation, performing steps of:
        (1) receiving a first output signal from a first microprocessor core coupled to a second port of a system fabric;
        (2) receiving a second output signal from a second microprocessor core coupled to a third port of the system fabric;
        (3) determining whether the first output signal differs from the second output signal;

(4) transmitting the first output signal to a first input/output port of the system fabric if it is determined that the first output signal does not differ from the second output signal;
(5) enabling the first port; and
(6) disabling the second and third ports.

8. The method of claim 7, wherein the step (A) further comprises steps of:
(7) receiving an input signal from the first input/output port;
(8) transmitting the input signal to the first microprocessor core; and
(9) transmitting the input signal to the second microprocessor core.

9. The method of claim 7, wherein the step (A) further comprises a step of:
(5) entering an unprotected mode of operation if an error signal is received from one of the first and second microprocessor cores; and
wherein the method further comprises a step of:
(B) in the unprotected mode of operation, performing a step of:
(1) transmitting an error recovery initiation signal to at least one of the first and second microprocessor cores.

10. The method of claim 9, wherein the step (B) comprises a step of transmitting the error recovery initiation signal to the first and second microprocessor cores.

11. The method of claim 9, wherein the step (A) (5) comprises a step of receiving the error signal from the first microprocessor core, and wherein the step (B) further comprises a step of:
(B) (2) transmitting the second output signal to the first input/output port of the system fabric.

12. The method of claim 7, wherein the switching fabric comprises a crossbar port.

13. The method of claim 7, wherein the switching fabric comprises a plurality of input/output ports, wherein the first input/output port comprises one of the plurality of input/output ports, and wherein the first input/output port operates at a frequency that differs from a frequency at which at least one other one of the plurality of input/output ports operates.

14. The method of claim 7, wherein the first microprocessor core is clocked by a first clock having a first frequency and wherein the first input/output port operates at a second frequency which differs from the first frequency.

15. The method of claim 7, wherein the first microprocessor core, the second microprocessor core, the switching fabric, and the lockstep logic are components of an integrated circuit.

16. A device comprising:
a first input to receive a first output signal from a first microprocessor core;
a second input to receive a second output signal from a second microprocessor core;
an XOR gate to compare the first output signal to the second output signal;
a latch to delay the first and second output signals and thereby produce first and second delayed output signals, respectively; and
output means, coupled to the delay means, for providing at least one of the first and second delayed output signals as output after the comparator compares the first output signal to the second output signal only if the first output signal is equivalent to the second output signal.

17. A device comprising:
a switching fabric having a first input/output port and a second input/output port;
a first microprocessor core coupled to the first input/output port;
a second microprocessor core coupled to the second input/output port;
lockstep logic, coupled to the first and second microprocessor cores, to detect whether the first output signal differs from the second output signal;
means for receiving a first output signal through the microprocessor core; and
means for transmitting the first output signal through the second microprocessor core to th second input/output port.

18. The device of claim 17, further comprising:
means for receiving a first output signal from the first microprocessor core; and
means for transmitting the first output signal through the first microprocessor core to the first input/output port.

19. The device of claim 17, further comprising:
means for receiving a first input signal from the first input/output port; and
means for transmitting the first input signal through the first microprocessor core to the second microprocessor core.

20. The device of claim 17, further comprising:
first transmission means for transmitting the first output signal to the first input/output port;
reception means for receiving a first input signal from the first input/output port; and
second transmission means for transmitting the first input signal to the first microprocessor core and to the second microprocessor core.

21. The device of claim 20, wherein the second transmission means comprises:
means for delaying the input signal to produce a second input signal;
means for transmitting the second input signal to the first microprocessor core; and
means for transmitting the first input signal to the second microprocessor core.

22. The device of claim 17, wherein the switching fabric comprises a crossbar.

23. The device of claim 17, wherein the first input/output port operates at a frequency that differs from a frequency at which the second input/output port operates.

24. The device of claim 17, wherein the first microprocessor core is clocked by a first clock having a first frequency and wherein the first input/output port operates at a second frequency which differs from the first frequency.

25. The device of claim 17, further comprising an integrated circuit including the first microprocessor core, the second microprocessor core, the switching fabric, and the lockstep logic.

26. The device of claim 17, further comprising:
means for transmitting a first n-bit output signal of one of the first and second microprocessor cores to the lockstep logic;
means for transmitting an m-bit signal comprising rn bits of the first n-bit signal from the lockstep logic to the first microprocessor core, wherein m<n;
means for combining the m-bit signal with a first (n-m) bit signal comprising (n-m) bits of a second n-bit output signal of the first microprocessor core to produce a third n-bit output signal; and means for transmitting the third n-bit output signal through the first microprocessor core to the first input/output port.

27. The device of claim 26, wherein the means for combining comprises:
means for delaying the first (n-m)-bit signal to produce a second (n-m)-bit signal; and
means for combining the m-bit signal with the second (n-m) bit signal to produce a third n-bit output signal.

28. An integrated circuit comprising:
a crossbar having a first input/output port and a second input/output port;
a first microprocessor core coupled to the first input/output port;
a second microprocessor core coupled to the second input/output port; and
lockstep logic, coupled to the first and second microprocessor cores, to detect whether the first output signal differs from the second output signal, the lockstep logic comprising:
means for receiving a first output signal from the first microprocessor core;
means for transmitting the first output signal through the first microprocessor core to the first input/output port; and
means for transmitting the first output signal through the second microprocessor core to the second input/output port.

29. A device comprising:
a first microprocessor core to generate a first output signal, the first microprocessor core being clocked by a first clock having a first frequency;
a second microprocessor core to generate a second output signal;
a switching fabric having a first input/output port operating at a second frequency which differs from the first frequency; and
lockstep logic, coupled between the first input/output port of the switching fabric and the first and second microprocessor cores, to detect whether the first output signal differs from the second output signal.

30. A method comprising a step of:
(A) in a lockstep mode of operation, performing steps of:
(1) receiving a first output signal from a first microprocessor core;
(2) receiving a second output signal from a second microprocessor core;
(3) determining whether the first output signal differs from the second output signal; and
(4) transmitting the first output signal to a first input/output port of a plurality of input/output ports of a system fabric if it is determined that the first output signal does not differ from the second output signal, the first input/output port operating at a frequency that differs from a frequency at which at least one other one of the plurality of input/output ports operates.

31. A method comprising a step of:
(A) in a lockstep mode of operation, performing steps of:
(1) receiving a first output signal from a first microprocessor core clocked by a first clock having a first frequency;
(2) receiving a second output signal from a second microprocessor core;
(3) determining whether the first output signal differs from the second output signal; and
(4) transmitting the first output signal to a first input/output port of a system fabric if it is determined that the first output signal does not differ from the second output signal, the first input/output port operating at a second frequency which differs from the first frequency.

32. A device comprising:
a switching fabric having a first input/output port and a second input/output port;
a first microprocessor core coupled to the first input/output port;
a second microprocessor core coupled to the second input/output port;
lockstep logic, coupled to the first and second microprocessor cores, to detect whether the first output signal differs from the second output signal;
first transmission means for transmitting the first output signal to the first input/output port;
reception means for receiving a first input signal from the first input/output port; and
second transmission means for transmitting the first input signal to the first microprocessor core and to the second microprocessor core, the second transmission means comprising:
means for delaying the input signal to produce a second input signal;
means for transmitting the second input signal to the first microprocessor core; and
means for transmitting the first input signal to the second microprocessor core.

33. A device comprising:
a switching fabric having a first input/output port and a second input/output port, the first input/output port operating at a frequency that differs from a frequency at which the second input/output port operates;
a first microprocessor core coupled to the first input/output port;
a second microprocessor core coupled to the second input/output port; and
lockstep logic, coupled to the first and second microprocessor cores, to detect whether the first output signal differs from the second output signal.

34. A device comprising:
a switching fabric having a first input/output port and a second input/output port;
a first microprocessor core coupled to the first input/output port;
a second microprocessor core coupled to the second input/output port;
lockstep logic, coupled to the first and second microprocessor cores, to detect whether the first output signal differs from the second output signal;
means for transmitting a first n-bit output signal of one of the first and second microprocessor cores to the lockstep logic;
means for transmitting an m-bit signal comprising m bits of the first n-bit signal from the lockstep logic to the first microprocessor core, wherein m<n;
means for combining the m-bit signal with a first (n-m) bit signal comprising (n-m) bits of a second n-bit output signal of the first microprocessor core to produce a third n-bit output signal; and
means for transmitting the third n-bit output signal through the first microprocessor core to the first input/output port.

* * * * *

UNITED STATES PATENT AND TRADEMARK OFFICE
CERTIFICATE OF CORRECTION

| | | |
|---|---|---|
| PATENT NO. | : 7,290,169 B2 | Page 1 of 1 |
| APPLICATION NO. | : 10/818975 | |
| DATED | : October 30, 2007 | |
| INVENTOR(S) | : Kevin David Safford et al. | |

It is certified that error appears in the above-identified patent and that said Letters Patent is hereby corrected as shown below:

In column 16, line 57, in Claim 7, after "first" insert -- port --.

In column 18, line 11, in Claim 17, delete "through the" and insert -- from the first --, therefor.

In column 18, line 14, in Claim 17, after "core to" delete "th" and insert -- the --, therefor.

In column 18, line 61, in Claim 26, after "comprising" delete "rn bits" and insert -- m bits --, therefor.

In column 20, line 56, in Claim 34, after "comprising" delete "rn bits" and insert -- m bits --, therefor.

Signed and Sealed this
Eighth Day of March, 2011

David J. Kappos
*Director of the United States Patent and Trademark Office*